(12) United States Patent
Takushima et al.

(10) Patent No.: US 7,272,278 B2
(45) Date of Patent: Sep. 18, 2007

(54) OPTICAL MULTIPLEXER/DEMULTIPLEXER

(75) Inventors: Michiko Takushima, Yokohama (JP); Tomomi Sano, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 140 days.

(21) Appl. No.: 11/140,573

(22) Filed: May 31, 2005

(65) Prior Publication Data

US 2005/0276538 A1    Dec. 15, 2005

Related U.S. Application Data

(60) Provisional application No. 60/576,607, filed on Jun. 4, 2004.

(30) Foreign Application Priority Data

Jun. 4, 2004   (JP)   ............... P2004-166586

(51) Int. Cl.
G02B 6/28     (2006.01)
G02B 6/293    (2006.01)
G02B 6/34     (2006.01)

(52) U.S. Cl. .............. 385/24; 385/18; 385/37
(58) Field of Classification Search ............ None
See application file for complete search history.

(56) References Cited

U.S. PATENT DOCUMENTS 5,960,133 A     9/1999   Tomlinson
6,097,859 A *   8/2000   Solgaard et al. ............... 385/17
6,657,770 B2*  12/2003   Marom et al. ............... 359/290
6,781,730 B2*   8/2004   Weaver et al. ............... 359/212
6,845,195 B2*   1/2005   Tedesco ........................ 385/37
6,868,205 B2*   3/2005   Weverka et al. .............. 385/31
6,959,132 B2*  10/2005   Cizek et al. .................. 385/47
6,975,789 B2*  12/2005   Weverka et al. .............. 385/18
6,996,309 B2*   2/2006   Ikeda et al. ................... 385/24
2001/0046350 A1* 11/2001  Tedesco ........................ 385/37

* cited by examiner

Primary Examiner—Rodney Bovernick
Assistant Examiner—Omar Rojas
(74) Attorney, Agent, or Firm—McDermott Will & Emery LLP

(57) ABSTRACT

The present invention relates a variable optical multiplexer/demultiplexer which can be made smaller and can restrain characteristics from deteriorating. The optical multiplexer/demultiplexer comprises a first optical system, a wavelength branching device, a second optical system, and an optical path changing part. The optical multiplexer/demultiplexer has a plurality of input/output ports, and the first optical system, the wavelength branching device, and the second optical system are disposed between the ports and the optical path changing part. When light is fed into any of the ports, individual wavelength components included in the light are outputted from any of the ports. The optical path changing part inputs the wavelength components condensed by the second optical system, and output the wavelength components to an output optical path which is parallel to but not on the same line as the input optical paths of the wavelength components.

17 Claims, 9 Drawing Sheets

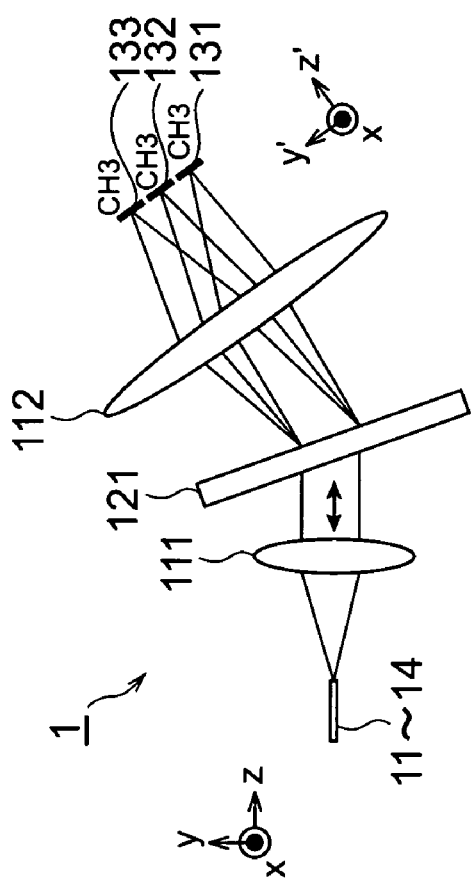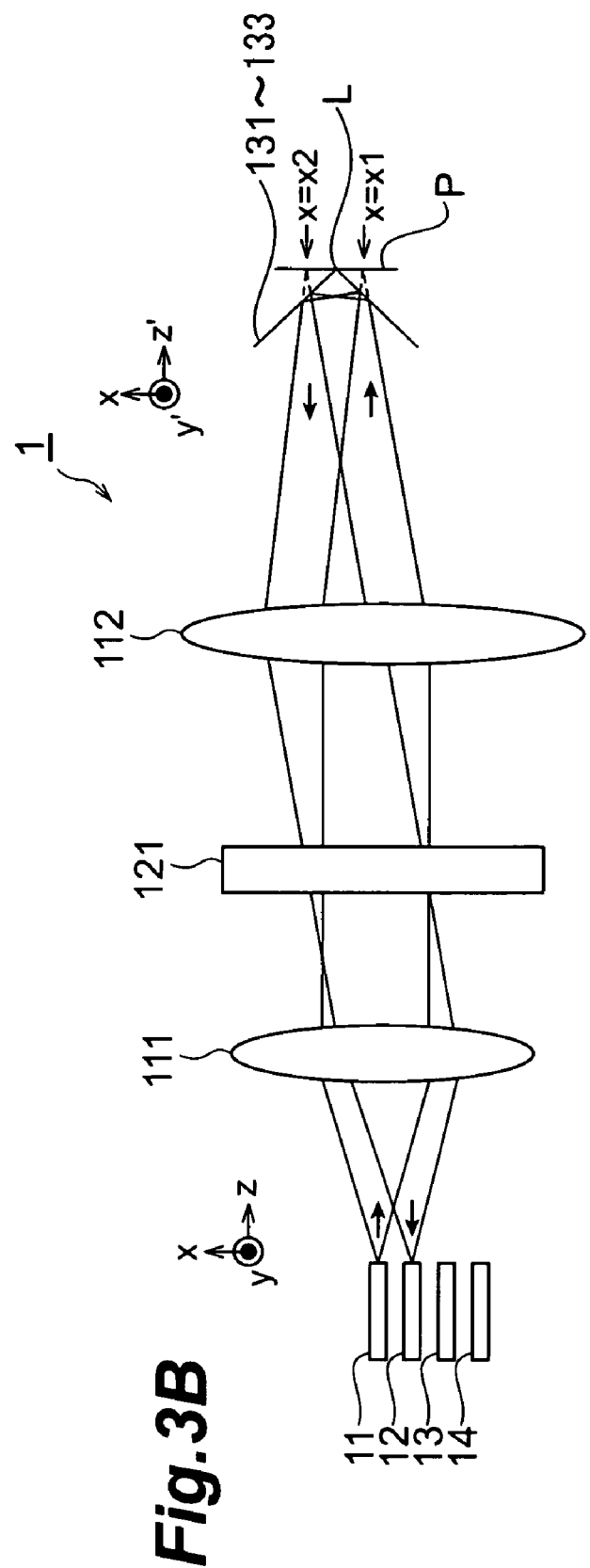
Fig.3A
Fig.3B

OPTICAL MULTIPLEXER/DEMULTIPLEXER

CROSS-REFERENCE TO RELATED APPLICATION

This application claims priority to Provisional Application Ser. No. 60/576,607 filed on Jun. 4, 2004 by the same Applicant, which is hereby incorporated by reference in its entirety.

BACKGROUND OF THE INVENTION

1. Field of the Invention

The present invention relates to an optical multiplexer/demultiplexer which multiplexes or demultiplexes signal light in a wavelength division multiplexing optical communication system and the like.

2. Related Background Art

In a wavelength division multiplexing (WDM) optical communication system which multiplexes signal light having a multitude of wavelengths and tansmits thus multiplexed signal light through an optical transmission line, an optical multiplexer/demultiplexer which multiplexes or demultiplexes signal light having a multitude of wavelengths is used. The optical multiplexer/demultiplexer disclosed in U.S. Pat. No. 5,960,133 (Document 1) is favorably used in an optical communication network which can select ports for inputting or outputting individual wavelength components, while making signal light transmission paths and signal light wavelengths flexible.

The optical multiplexer/demultiplexer disclosed in Document 1 comprises a wavelength branching device for spatially splitting the individual wavelength components included in light fed into an input port, and a rotary mirror for arbitrarily choosing an output port to output each wavelength component split by the wavelength branching device. Namely, an output port which is an output destination for each wavelength component is determined by an angle of rotation of the rotary mirror.

FIG. 1 is a schematic view of a conventional optical multiplexer/demultiplexer disclosed in Document 1. In the conventional optical multiplexer/demultiplexer 9, light emitted from an end face of an optical fiber 11 is collimated by an optical system 111, so as to be made incident on a diffraction grating device 121, and is diffracted by the diffraction grating device 121 by different diffraction angles for respective wavelengths, so that different wavelengths are outputted to their respective optical paths. The individual wavelength components (λ1 to λ3), outputted from the diffraction grating device 121, are condensed by an optical system 112.

The wavelength component λ1 condensed by the optical system 112 is reflected by a mirror reflector 131 disposed at a light-condensing position thereof, so as to be fed into the optical system 112 again. The wavelength component λ2 condensed by the optical system 112 is reflected by a mirror reflector 132 disposed at a light-condensing position thereof, so as to be fed into the optical system 112 again. The wavelength component λ3 condensed by the optical system 112 is reflected by a mirror reflector 133 disposed at a light-condensing position thereof, so as to be fed into the optical system 112 again.

The respective wavelength components reflected by the mirror reflectors 131 to 133 and then fed into the optical system 112 are collimated by the optical system 112, so as to be fed into the diffraction grating device 121, and then are diffracted by the diffraction grating device 121, so as to be fed into the optical system 111. The wavelength components fed from the diffraction grating device 121 into the optical system 111 are condensed by the optical system 111, so as to be made incident on any of the optical fibers 11 to 13.

The optical multiplexer/demultiplexer 9 allows each wavelength component emitted from an optical fiber end face to be made incident on any optical fiber end face, and can arbitrarily select entrance/exit optical fibers by setting angles of inclination of the mirror reflectors 131 to 133.

SUMMARY OF THE INVENTION

The inventors have studied conventional optical multiplexer/demultiplexers in detail, and as a result, have found problems as follows. Namely, the conventional optical multiplexer/demultiplexer disclosed in Document 1 has a problem as will be explained in the following. FIGS. 2A and 2B are views for explaining a problem of the conventional optical multiplexer/demultiplexer 9. FIG. 2A shows a relationship between transmittance to wavelength components, and FIG. 2B shows how light is condensed by the optical system 112 in respective reflecting surfaces of the mirror reflectors 131 to 133. Referring to the mirror reflector 132 in the middle of the mirror reflectors 131 to 133, the light reaching the mirror reflector 132 after being condensed by the optical system 112 includes not only the center wavelength component λ2, but also wavelength components in its vicinity. When only a specific single wavelength component reaching the mirror reflector 132 is concerned, the condensed light in the reflecting surface of the mirror reflector 132 is not an ideal point but has a certain extent φ. Therefore, the mirror reflector 132 has such a reflecting characteristic that its reflectance becomes lower at a wavelength farther from the center wavelength λ2. As a result, the optical multiplexer/demultiplexer 9 deteriorates its characteristics.

For restraining the characteristics from deteriorating, it will be sufficient if lenses having a greater focal length f with a larger diameter are used as respective lenses of the optical system 111 provided so as to correspond to the optical fibers 11 to 13. This enlarges the diameter of a luminous flux incident on the optical system 112 from the diffraction grating device 121, so that the respective condensed light diameters in the reflecting surfaces of the mirror reflectors 131 to 133 become smaller, whereby the optical multiplexer/demultiplexer 9 can be prevented from deteriorating its characteristics.

When using a lens having a greater focal length f with a larger diameter in the optical system 111, not only the optical system 111 becomes longer, but also the total width w of light propagating through the optical system 111 becomes greater, whereby the optical multiplexer/demultiplexer 9 increases its size. Also, a high grade technique is required for designing and processing each lens constituting the optical system 111.

In order to overcome the above-mentioned problems, it is an object of the present invention to provide a variable optical multiplexer/demultiplexer which can be made smaller and can restrain characteristics from deteriorating.

The optical multiplexer/demultiplexer according to the present invention is an optical multiplexer/demultiplexer which, when light is fed into any of a plurality of ports, causes any of the plurality of ports to output a wavelength component included in the light. The optical multiplexer/demultiplexer comprises a first optical system, a first wavelength branching device, a second optical system, an optical path changing part, a third optical system, a second wavelength branching device, and a fourth optical system. The first optical system outputs light fed into any of the plurality of ports. The first wavelength branching device spatially splits wavelength components included in the light and outputting the split wavelength components into respective optical paths different from each other. The second optical system condenses the wavelength components outputted from the first wavelength branching device. The optical path changing part inputs the wavelength components condensed by the second optical system and outputs the wavelength components onto an output optical path not located on the same line as an input optical path of the wavelength components. The output optical path is preferably changeable. The third optical system inputs the light outputted from the optical path changing part and outputs the light. The second wavelength branching device inputs the wavelength components outputted from the third optical system, changes a traveling direction thereof according to the wavelength, and then outputs the wavelength components. The fourth optical system inputs the wavelength components outputted from the second wavelength branching device, condenses the wavelength components, and causes any of the plurality of ports to output the wavelength components. Here, it will be preferred when at least one of the first and third optical systems collimates inputted light and outputs the collimated light. It is preferable that the first and third optical systems have respective focal points located on respective sides opposite from each other in a direction of light incidence. Furthermore, it is preferable that at least one of the first and second wavelength branching devices includes a diffraction grating device.

In this optical multiplexer/demultiplexer, light fed into any of a plurality of ports is collimated by the first optical system, and then is spatially split into individual wavelength components by the first wavelength branching device, so as to be outputted to respective optical paths different from each other. The wavelength components outputted from the first wavelength branching device are collected by the second optical system, and their optical paths are changed by the optical path changing part. The output optical path of the light outputted from the optical path changing part is not the same as but is parallel to the input optical path of the light fed into the optical path changing part while being changeable. The light outputted from the optical path changing part is collimated by the third optical system, then is caused by the second wavelength branching device to change the advancing direction according to the wavelength, and is condensed by the fourth optical system, so as to be outputted from any of the plurality of ports by way of optical paths parallel to each other.

Preferably, in the optical multiplexer/demultiplexer according to the present invention, the first and fourth optical systems are common with each other, the second and third optical systems are common with each other, the first and second wavelength branching devices are common with each other, and the optical path changing part turns the input optical path so as to make the output optical path. Here, it will be preferred when the optical path changing part includes first and second reflecting surfaces substantially perpendicular to each other; each of the first and second reflecting surfaces is inclinable with respect to a plane including principal rays of the wavelength components having traveled through the first optical system, first wavelength branching device, and second optical system after being outputted from the same port and with respect to an optical axis of the second optical system; and the first and second reflecting surfaces successively reflect the light, so as to turn the optical path.

In the optical multiplexer/demultiplexer according to the present invention, the first and fourth optical systems are preferably separate from each other, the second and third optical systems are separate from each other, the first and second wavelength branching devices are separate from each other, and the optical path changing part substantially translates the input optical path so as to make the output optical path. Here, it will be preferred if the optical path changing part includes first and second reflecting surfaces substantially parallel to each other; each of the first and second reflecting surfaces is inclinable with respect to a plane including principal rays of the wavelength components having traveled through the first optical system, first wavelength branching device, and second optical system after being outputted from the same port and with respect to an optical axis of the second optical system; and the first and second reflecting surfaces successively reflect the light, so as to translate the optical path.

In the optical multiplexer/demultiplexer according to the present invention, each of the first and second reflecting surfaces of the optical path changing part is preferably movable in a direction substantially parallel to a plane including principal rays of the wavelength components having traveled through the first optical system, first wavelength branching device, and second optical system after being outputted from the same port, and changes the output optical path by the movement. Preferably, the first and second reflecting surfaces of the optical path changing part have a fixed relative positional relationship therebetween. Preferably, a light-condensing position is located at a midpoint between the first and second reflecting surfaces of the optical path changing part. Preferably, a first condensing optical system is disposed between the first reflecting surface and the light-condensing position, a second condensing optical system is disposed between the second reflecting surface and the light-condensing position, and the first and second reflecting surfaces have respective light-condensing positions. Preferably, the plurality of ports are arranged in a direction perpendicular to a plane including principal rays of the wavelength components having traveled through the first optical system, first wavelength branching device, and second optical system after being outputted from the same port.

The present invention will be more firmly understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIGS. 3A and 3B are schematic views of an optical multiplexer/demultiplexer of a first embodiment according to the present invention;

DETAILED DESCRIPTION OF THE PREFERRED EMBODIMENTS

Figure 1:
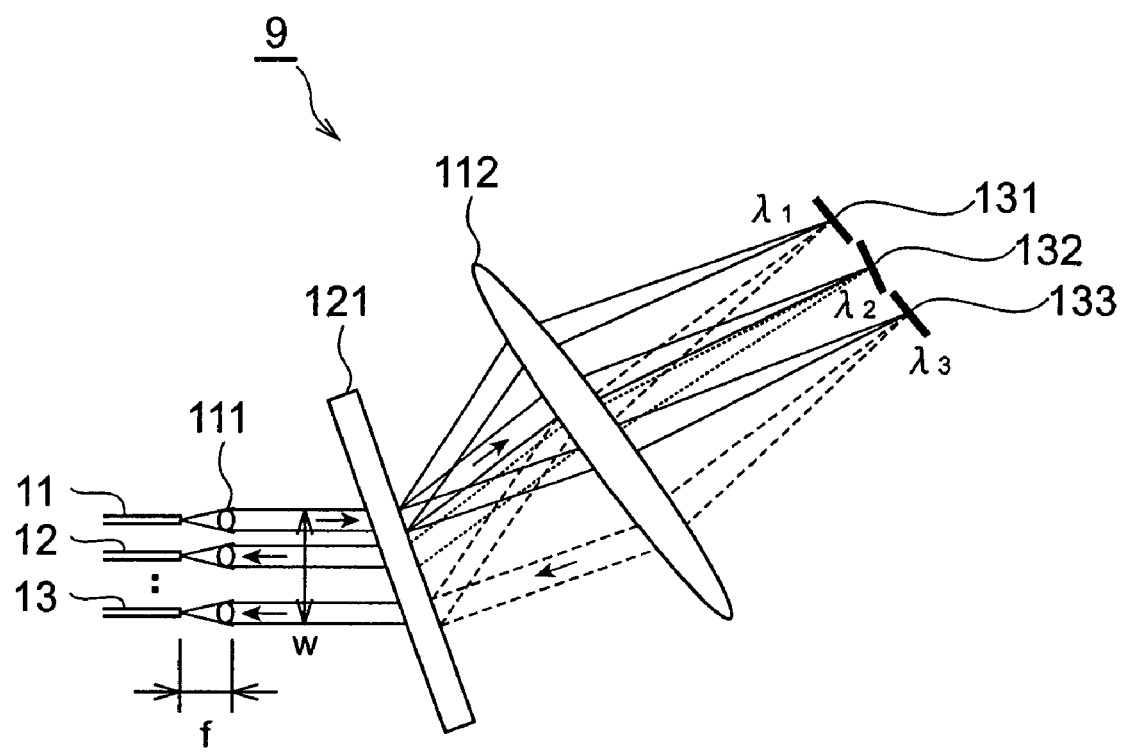
FIG. 1 is a schematic view of a configuration of a conventional optical multiplexer/demultiplexer.
Figure 2A:
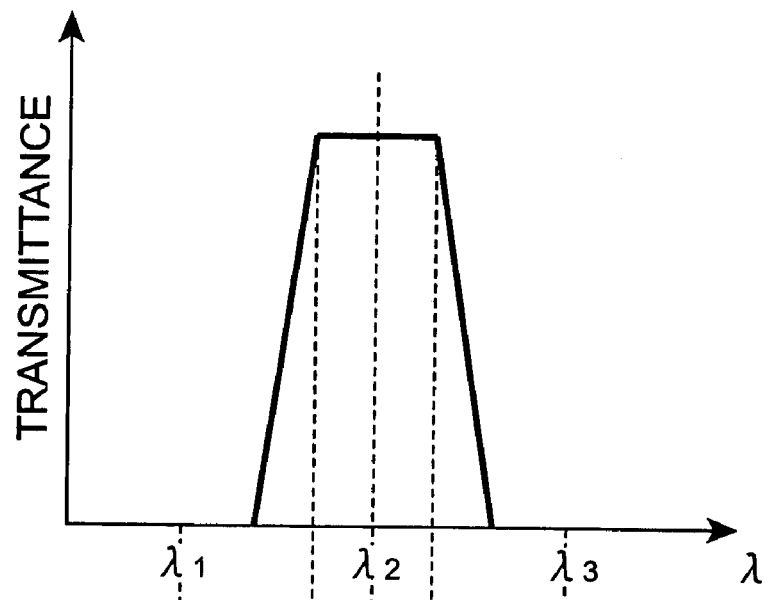
FIGS. 2A and 2B are views for explaining a problem of the conventional optical multiplexer/demultiplexer.
Figure 2B:
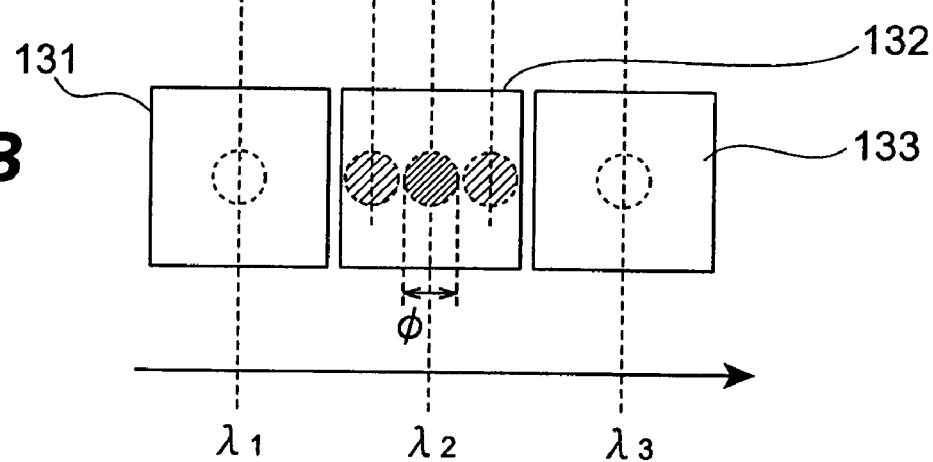

In the following, embodiments of an optical component, an optical device and an optical communications system according to the present invention will be explained in detail with reference to FIGS. 3A, 3B, 4, 5A-5C, and 6-9. In the explanation of the drawings, constituents identical to each other will be referred to with numerals identical to each other without repeating their overlapping descriptions.

First Embodiment

To begin with, a first embodiment of the present invention will be explained. FIGS. 3A and 3B are schematic views of an optical multiplexer/demultiplexer 1 of a first embodiment according to the present invention. The optical multiplexer/demultiplexer 1, shown in FIGS. 3A and 3B comprises an optical system 111, a diffraction grating device 121, an optical system 112, and optical path changing parts 131 to 133. In the optical multiplexer/demultiplexer 1, input/output ports are disposed at respective end face positions of the optical fibers 11 to 14. When light is fed into any of the four ports, individual wavelength components included in the light are outputted from any of the four ports.

Between the optical fibers 11 to 14 and the diffraction grating device 121, an xyz orthogonal coordinate system is set whereas the z-axis is set parallel to the optical axis of the optical system 111. Between the diffraction grating device 121 and the optical path changing parts 131 to 133, an xy'z' orthogonal coordinate system is set, whereas the z'-axis is set parallel to the optical axis of the optical system 112. The x-axis is set parallel to directions in which the gratings in the diffraction grating device 121 extend.

FIG. 3A is a projected plan onto the yz- (y'z'-) plane. FIG. 3B is a projected plan onto the xz-plane between the optical fibers 11 to 14 and the diffraction grating device 121, and a projected plan onto the xz'-plane between the diffraction grating device 121 and the optical path changing parts 131 to 133.

The optical fibers 11 to 14 are disposed in parallel on a common plane parallel to the xz-plane. Light components incident on or emitted from the respective end faces of the optical fibers 11 to 14 advance in parallel to the z-axis.

When light is emitted from any of the optical fibers 11 to 14, the optical system 111 inputs the light, collimates the inputted light, and outputs thus collimated light. The light outputted from the optical system 111 after being collimated advances parallel to the xz-plane.

The diffraction grating device 121 acts as a wavelength branching device, so as to input the light collimated by the optical system 111, spatially split wavelength components (three wavelengths $\lambda 1$ to $\lambda 3$ in this embodiment), and output thus split wavelength components to respective optical paths different from each other. The gratings of the diffraction grating device 121 extend along the x-axis.

The individual wavelength components outputted from the diffraction grating device 121 in this forward path advance in the same direction as that at the time of inputting to the diffraction grating device 121 when projected onto the xz- (xz'-) plane as shown in FIG. 3B, and in respective directions different from each other depending on their wavelengths when projected onto the yz-(y'z'-) plane as shown in FIG. 3A.

The optical system 112 condenses the wavelength components outputted from the diffraction grating device 121. Here, the wavelength components condensed by and outputted from the optical system 112 advance in directions parallel to the y'z'-plane. The respective light-condensing positions of the wavelength components align on a line which is located on the image-side focal plane P of the optical system and parallel to the y'-axis.

The optical path changing part 131 inputs the wavelength component $\lambda 1$ condensed by the optical system 112, and outputs this wavelength component to an output optical path which is parallel to the input optical path of thus inputted wavelength component but is not on the same line. The optical path changing part 132 inputs the wavelength component $\lambda 2$ condensed by the optical system 112, and outputs this wavelength component to an output optical path which is parallel to the input optical path of thus inputted wavelength component but is not on the same line. The optical path changing part 133 inputs the wavelength component $\lambda 3$ condensed by the optical system 112, and outputs this wavelength component to an output optical path which is parallel to the input optical path of thus inputted wavelength component but is not on the same line. The optical path changing parts 131 to 133 can change their output optical paths. In particular, the optical path changing parts 131 to 133 in this embodiment turn their input optical paths, so as to make respective output optical paths.

Figure 4:
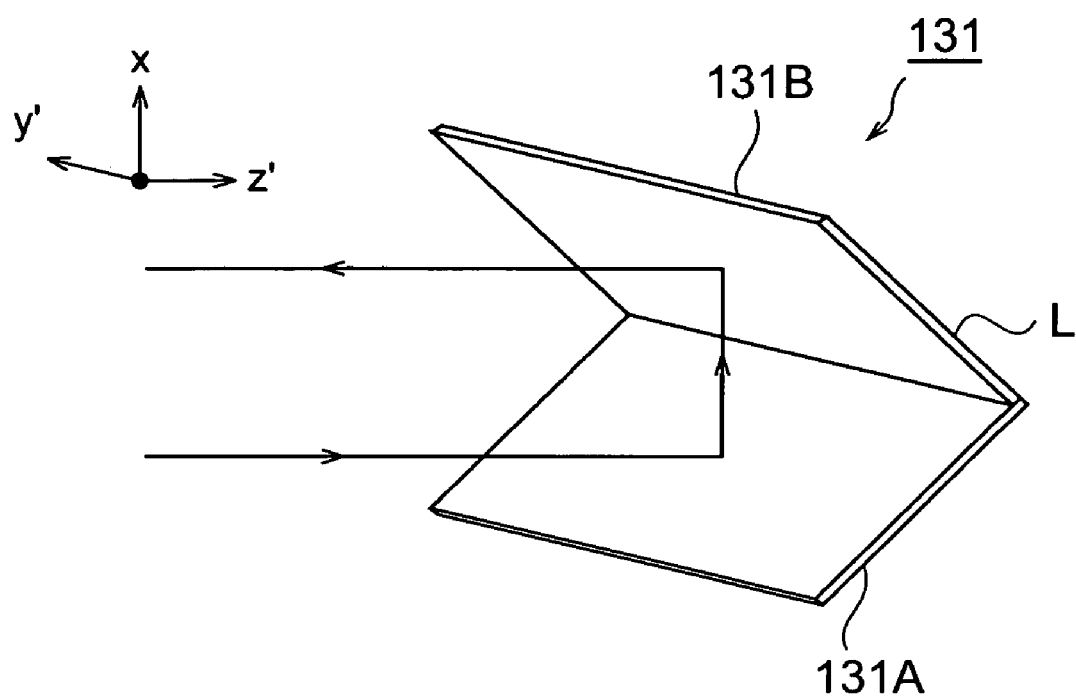
FIG. 4 is a perspective view for explaining a configuration of the optical path changing part of the first embodiment.

FIG. 4 is a perspective view for explaining a configuration of the optical path changing part 131. The optical path changing parts 131 to 133 have a common configuration. The optical path changing part 131 includes a first reflecting surface 131A and a second reflecting surface 131B which perpendicularly meet at a line of intersection L, while being tilted by 45 degrees with respect to a plane (i.e., a plane parallel to the y'z'-plane) including principal rays of the individual wavelength components having traveled through the optical system 111, diffraction grating 121, and optical system 112 after being outputted from the same port, and by 45 degrees with respect to the optical axis of the optical system 112 (i.e., a line parallel to the z'-axis). The optical path changing part 131 successively reflects light by the first reflecting surface 131A and the second reflecting surface 131B, so as to turn the optical path.

In each of the optical path changing parts 131 to 133, each of the first and second reflecting surfaces is movable in directions perpendicular to a plane (i.e., a plane parallel to the y'z'-plane) including principal rays of the individual wavelength components having traveled through the optical system 111, diffraction grating device 121, and optical system 112 after being outputted from the same port (i.e., directions parallel to the x-axis), whereas the output optical paths can be changed by this movement. Preferably, in each of the optical path changing parts 131 to 133, the first and second reflecting surfaces have a fixed relative positional relationship therebetween, and are movable together in directions parallel to the x-axis. In each of the optical path changing parts 131 to 133, a light-condensing position is located at a midpoint between the first and second reflecting surfaces.

Referring to FIGS. 3A and 3B again, the optical system 112 inputs the light components having their optical paths turned by the optical path changing parts 131 to 133, collimates the inputted light components, and outputs thus collimated light components. The diffraction grating device 121 inputs the wavelength components collimated by the optical system 112, changes their advancing directions according to their wavelengths, and outputs the wavelength components.

The individual wavelength components outputted from the diffraction grating device 121 in this return path advance in the same direction as that at the time of inputting to the diffraction grating device 121 when projected onto the xz-(xz'-) plane as shown in FIG. 3B, and in respective directions different from each other depending on their wavelengths when projected onto the yz-(y'z'-) plane as shown in FIG. 3A.

When the forward and return paths are compared with each other, the respective optical paths before and after the diffraction grating device 121 are the same when projected onto the yz- (y'z'-) plane as shown in FIG. 3A, but differ from each other when projected onto the xz- (xz'-) plane as shown in FIG. 3B.

The optical system 111 inputs and condenses the wavelength components outputted from the diffraction grating device 121, and makes them incident on any of the end faces of the optical fibers 11 to 14 by way of the respective optical paths parallel to the z-axis.

Operations of the optical multiplexer/demultiplexer 1 according to the first embodiment will now be explained with reference to FIGS. 3A and 3B. In FIG. 3B, position x1 is a position (x-coordinate value) at which the light emitted from the end face of the optical fiber 11 is condensed by the optical system 112. Position x2 is a position (x-coordinate value) at which the light emitted from the end face of the optical fiber 12 is condensed by the optical system 112.

Namely, when the optical path changing part 131 does not exist, the wavelength component λ1 emitted from the end face of the optical fiber 11 successively travels through the optical system 111, diffraction grating device 121, and optical system 112, so as to be condensed at the position x1 on the image-side focal plane P of the optical system 112. Also, when the optical path changing part 131 does not exist, the wavelength component λ1 emitted from the position x2 on the image-side focal plane P of the optical system 112 successively travels through the optical system 112, diffraction grating device 121, and optical system 111, so as to be made incident on the end face of the optical fiber 112 while being condensed.

As shown in FIG. 3B, the line of intersection L of the optical path changing part 131 is assumed to be located at the midpoint ((x1+x2)/2) between the positions x1 and x2 on the image-side focal plane P of the optical system 112. Here, the wavelength component λ1 having traveled through the forward path after being emitted from the end face of the optical fiber 11 is condensed at the midpoint between the first and second reflecting surfaces of the optical path changing part 131, and the optical path changing part 131 turns the optical path. The light after turning the optical path advances as with the light emitted from position x2 on the image-side focal plane P of the optical system 112 in the case without the optical path changing part 131, and is made incident on the end face of the optical fiber 12 by way of the return path while being condensed.

The forward and return paths of the wavelength component λ1 are parallel to each other between the optical path changing part 131 and the optical system 112, form respective angles different from each other with the y'z'-plane between the optical path 112 and the diffraction grating device 121, form respective angles different from each other with the yz-plane between the diffraction grating device 121 and the optical system 111, and are parallel to each other between the optical system 111 and the optical fibers 11, 12. The distance between the forward and return paths between the optical system 111 and optical fibers 11, 12 conforms to the distance between the forward and return paths between the optical path changing part 131 and the optical system 112.

Therefore, if the distance between the forward and return paths between the optical path changing part 131 and the optical system 112 can be changed, the light emitted from the end face of the optical fiber 11 can selectively be made incident on the end face of any of the optical fibers 12 to 14. Namely, when the optical path changing part 131 is made movable along the x-axis, and the position of the optical path changing part 131 is set appropriately, the input/output ports can be selected. The same holds in the other optical path changing parts 132, 133.

Thus configured optical multiplexer/demultiplexer 1 can use a common optical system 111 for four input/output ports (i.e., four optical fibers 11 to 14). Therefore, when the focal length of the optical system 111 is increased, so as to reduce the diameter of condensed light in the optical path changing parts 131 to 133, characteristics can be restrained from deteriorating. Even in this case, the total width of light propagating through the optical system 111 can be reduced, whereby a smaller size can be achieved.

Second Embodiment

Figure 5A:
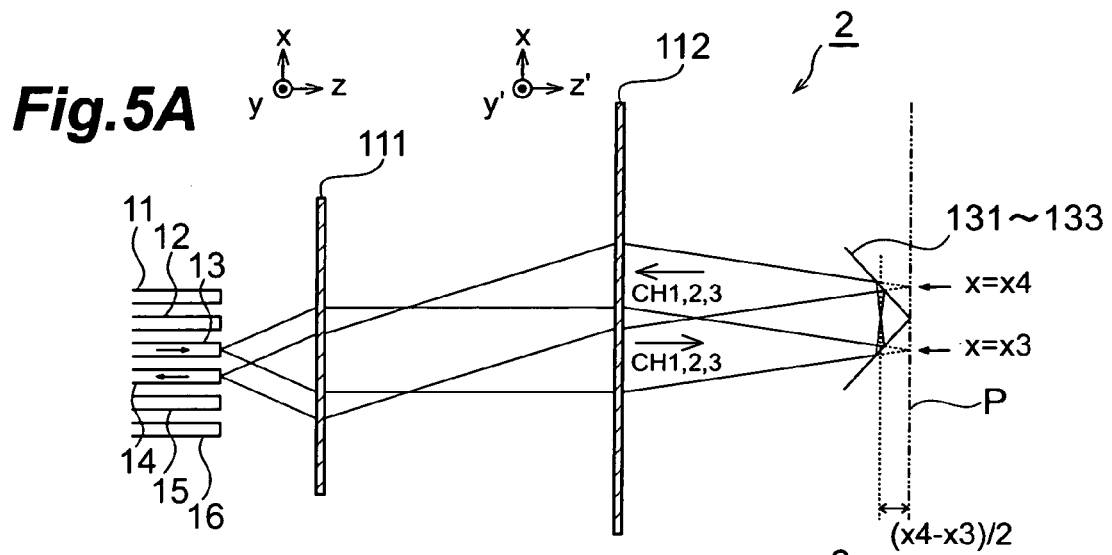
FIGS. 5A to 5C are schematic views of an optical multiplexer/demultiplexer of a second embodiment according to the present invention.
Figure 5B:
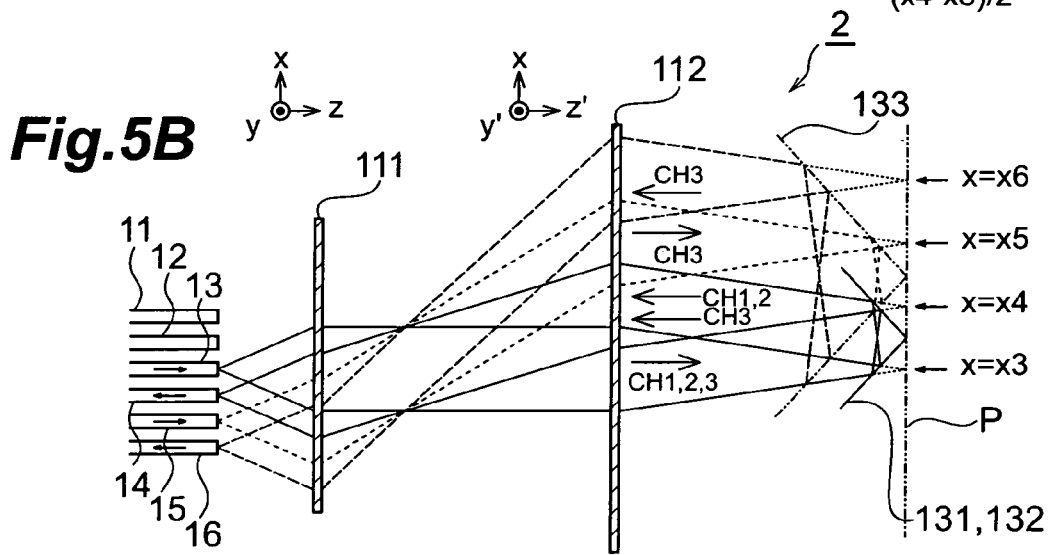
Figure 5C:
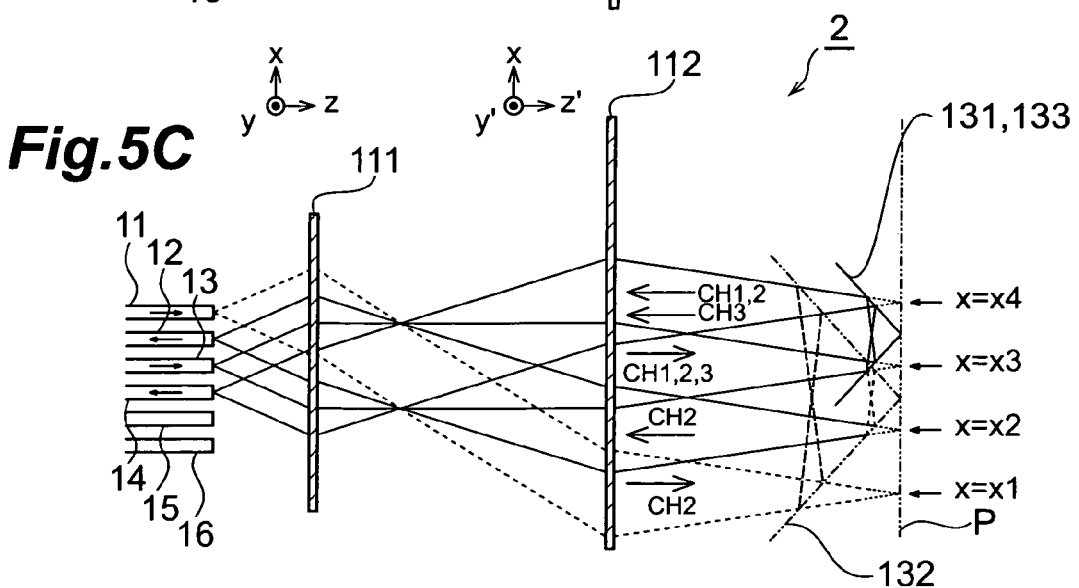

A second embodiment of the optical multiplexer/demultiplexer according to the present invention will now be explained. FIGS. 5A to 5C are schematic views of an optical multiplexer/demultiplexer of a second embodiment according to the present invention. The optical multiplexer/demultiplexer 2, shown in FIGS. 5A to 5C, comprises an optical system 111, a diffraction grating device (not depicted), an optical system 112, and optical path changing parts 131 to 133. Their configurations are the same as those in the first embodiment. Also, xyz and xy'z' orthogonal coordinate systems are set as in the first embodiment.

This optical multiplexer/demultiplexer 2 has input/output ports at respective end face positions of optical fibers 11 to 16. When light is fed into any of these six ports, individual wavelength components included in the light are outputted from any of the six ports. The optical multiplexer/demultiplexer 2 can be used as an optical ADM (Add Drop Multiplexer).

Each of FIGS. 5A to 5C is a projected plan onto the xz-plane between the optical fibers 11 to 16 and the diffraction grating device, and a projected plan onto the xz'-plane between the diffraction grating device and the optical path changing parts 131 to 133. Projected plans onto the yz-(y'z'-) plane are similar to FIG. 3A and thus are not shown here.

In each of FIGS. 5A to 5C, position x1 is a position (x-coordinate value) at which the light emitted from the end face of the optical fiber 11 is condensed by the optical system 112. Position x2 is a position (x-coordinate value) at which the light emitted from the end face of the optical fiber 12 is condensed by the optical system 112. Position x3 is a position (x-coordinate value) at which the light emitted from the end face of the optical fiber 13 is condensed by the optical system 112. Position x4 is a position (x-coordinate value) at which the light emitted from the end face of the optical fiber 14 is condensed by the optical system 112. Position x5 is a position (x-coordinate value) at which the light emitted from the end face of the optical fiber 15 is condensed by the optical system 112. Position x6 is a position (x-coordinate value) at which the light emitted from the end face of the optical fiber 16 is condensed by the optical system 112.

In FIG. 5A, the respective lines of intersection L of the optical path changing parts 131 to 133 are located at the midpoint ((x3+x4)/2) between the positions x3 and x4 on the image-side focal plane P of the optical system 112. Here, the individual wavelength components having traveled through the forward path after being emitted from the end face of the optical fiber 13 are split in terms of wavelengths by the diffraction grating device after passing the optical system 111, and then are condensed by the optical system 112, and their optical paths are turned by any of the optical path changing parts 131 to 133 corresponding to their wavelengths. The light after turning the optical path advances as with the light emitted from the position x4 on the image-side focal plane P of the optical system 112 in the case without the optical path changing parts 131 to 133, and is made incident on the end face of the optical fiber 14 by way of the return path while being condensed.

In FIG. 5B, the respective lines of intersection L of the optical path changing parts 131, 132 are located at the midpoint ((x3+x4)/2) between the positions x3 and x4 on the image-side focal plane P of the optical system 112. On the other hand, the line of intersection L of the optical path changing part 133 is located at the midpoint ((x4+x5)/2) between the positions x4 and x5 on the image-side focal plane P of the optical system 112.

Here, among the wavelength components λ1 to λ3 emitted from the end face of the optical fiber 13, the wavelength components λ1, λ2 have their optical paths turned by the optical path changing part 133, so as to be made incident on the end face of the optical fiber 14 while being condensed. On the other hand, among the wavelength components λ1 to λ3 emitted from the end face of the optical fiber 13, the wavelength component λ3 has its optical path turned by the optical path changing part 133, so as to advance as with the light emitted from the position x6 on the image-side focal plane P of the optical system 112 in the case without the optical path changing part 133, and is made incident on the end face of the optical fiber 16 by way of the return path while being condensed.

When the wavelength component λ3 is emitted from the end face of the optical fiber 15, this wavelength component has its optical path turned by the optical path changing part 133, so as to advance as with the light emitted from the position x4 on the image-side focal plane P of the optical system 112 in the case without the optical path changing part 133, and is made incident on the end face of the optical fiber 14 by way of the return path while being condensed. Thus, among the wavelength components λ1 to λ3 emitted from the end face of the optical fiber 13, the wavelength component λ3 is made incident on the end face of the optical fiber 16 while being condensed, whereas the wavelength components λ1, λ2 are made incident on the end face of the optical fiber 14 together with the wavelength component λ3 emitted from the end face of the optical fiber 15.

In FIG. 5C, the respective lines of intersection L of the optical path changing parts 131, 133 are located at the midpoint ((x3+x4)/2) between the positions x3 and x4 on the image-side focal plane P of the optical system 112. On the other hand, the line of intersection L of the optical path changing part 132 is located at the midpoint ((x2+x3)/2) between the positions x2 and x3 on the image-side focal plane P of the optical system 112.

Here, among the wavelength components λ1 to λ3 emitted from the end face of the optical fiber 13, the wavelength component λ3 has its optical path turned by the optical path changing parts 131, 133, so as to be made incident on the end face of the optical fiber 14 while being condensed. On the other hand, among the wavelength components λ1 to λ3 emitted from the end face of the optical fiber 13, the wavelength component λ2 has its optical path turned by the optical path changing part 132, so as to advance as with the light emitted from the position x2 on the image-side focal plane P of the optical system 112 in the case without the optical path changing part 132, and is made incident on the end face of the optical fiber 12 by way of the return path while being condensed.

When the wavelength component λ2 is emitted from the end face of the optical fiber 11, this wavelength component has its optical path turned by the optical path changing part 132, so as to advance as with the light emitted from the position x4 on the image-side focal plane P of the optical system 112 in the case without the optical path changing part 132, and is made incident on the end face of the optical fiber 14 by way of the return path while being condensed. Thus, among the wavelength components λ1 to λ3 emitted from the end face of the optical fiber 13, the wavelength component λ2 is made incident on the end face of the optical fiber 12 while being condensed, whereas the wavelength components λ1, λ3 are made incident on the end face of the optical fiber 14 together with the wavelength component λ2 emitted from the end face of the optical fiber 11.

As in the foregoing, the optical multiplexer/demultiplexer 2 can select input/output ports for individual wavelength components by changing the respective positions of the optical path changing parts 131 to 133 along the x-axis, and thus can be used as a variable optical ADM. Enlarging the movable range of the optical path changing parts can increase the number of input/output ports. As the number of optical path changing parts is made greater, the number of wavelengths of light which can be multiplexed or demultiplexed can be increased.

Let $f_1$ be the focal length of the optical system 111, and $f_2$ be the focal length of the optical system 112. Let $\Delta x_f$ be the pitch of arrangement of the optical fibers 11 to 16, and $\Delta x_m$ (=x1−x2=x2−x3= . . . =x5−x6) be the pitch of arrangement of the optical path changing parts 131 to 133. Here, these parameters have the relationship represented by the following expression:

$$\Delta x_f / f_1 = \Delta x_m / f_2 \tag{1}$$

Assuming that the maximum value of the distance between two optical fibers receiving and emitting light is $\Delta x_{f,max}$, it is necessary for each of the optical path changing parts 131 to 133 to have a width sufficiently greater than $\Delta x_{f,max} \, f_2/f_1$ along the x-axis.

In each of the optical path changing parts 131 to 133, the distance between the reflecting position in each of the first and second reflecting surfaces and the image-side focal plane P of the optical system 112 is one half of the distance between the forward and return paths. For reducing the loss of light at the time of turning its optical path, it is necessary for each of the optical path changing parts 131 to 133 to have a sufficiently large width along the x-axis taking account of the luminous flux diameter at the reflecting positions.

Since the optical fiber end face positions (i.e., input/output port positions) are disposed not continuously but discretely, no light is incident near the lines of intersection L in the optical path changing parts 131 to 133. Therefore, as shown in FIG. 4, the first and second reflecting surfaces may not directly intersect with each other perpendicularly in each of the optical path changing parts 131 to 133.

Preferably, the respective centers of luminous fluxes from the optical system 111 to the first reflecting positions of the optical path changing parts 131 to 133 are parallel to the respective centers of luminous fluxes from the second reflecting positions of the optical path changing parts 131 to 133 to the optical system 111, whereas the optical system 112 is designed so as to become a telecentric optical system with respect to the image-side focal plane P of the optical system 112. Similarly, it will be preferred if the respective centers of luminous fluxes between the optical fibers 11 to 16 and the optical system 112 are parallel to each other, and the optical system 112 is designed so as to become a telecentric optical system with respect to a plane, parallel to the xy-plane, including the end face positions of the optical fibers 11 to 16.

Figure 6:
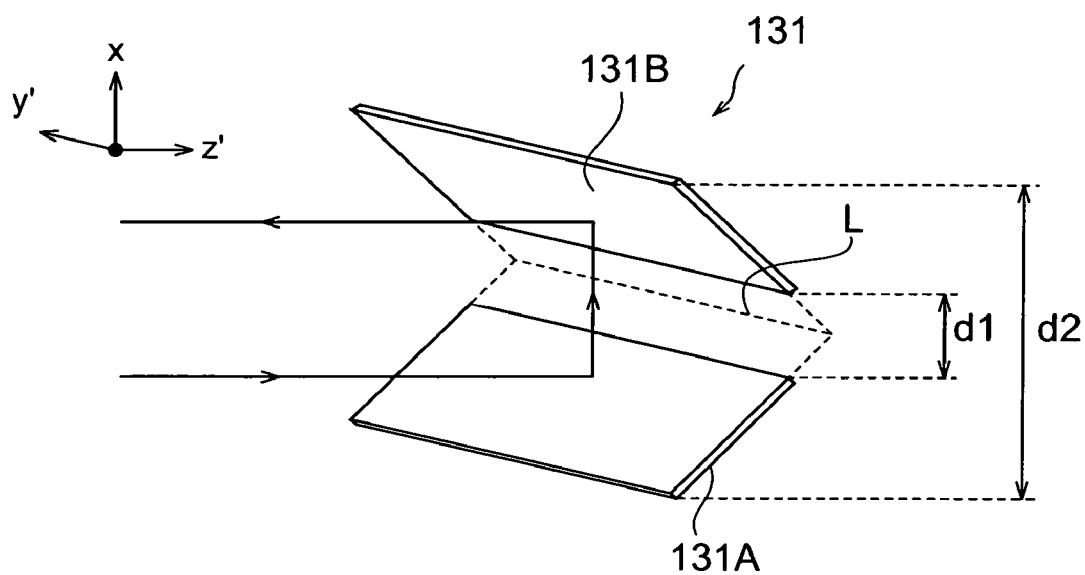
FIG. 6 is a perspective view for explaining another configuration of the optical path changing part of the second embodiment.

FIG. 6 is a perspective view for explaining another configuration of the optical path changing part 131. The configuration shown in FIG. 6 differs from the one shown in FIG. 4 in that the first reflecting surface 131A and second reflecting surface 131B are perpendicular to each other but do not directly intersect with each other perpendicularly. Respective extended planes of the reflecting surfaces intersect with each other perpendicularly at their line of intersection L. Assuming that the minimum value of the distance between two optical fibers receiving and emitting light is $\Delta x_{f,min}$, it is necessary for the distance d1 along the x-axis between the first reflecting surface 131A and second reflecting surface 131B to be smaller than the value obtained when the luminous flux diameter at the reflecting position is subtracted from $\Delta x_{f,min} f_2/f_1$. On the other hand, it is necessary for the total width d2 along the x-axis of the first reflecting surface 131A and second reflecting surface 131B to be greater than the value obtained when the luminous flux diameter at the reflecting position is added to the above-mentioned $\Delta x_{f,max} f_2/f_1$.

Figure 7:
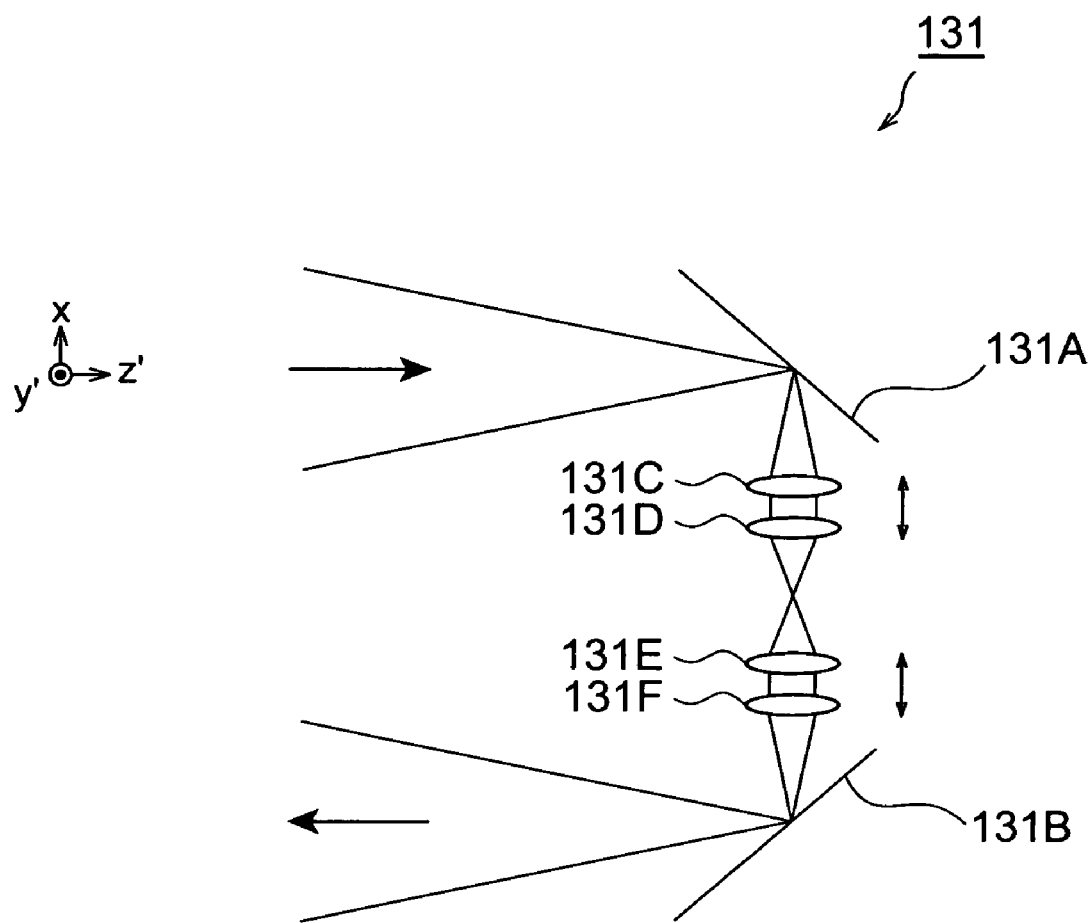
FIG. 7 is a perspective view for explaining still another configuration of the optical path changing part of the second embodiment.

FIG. 7 is a perspective view for explaining still another configuration of the optical path changing part 131. The optical path changing part 131 shown in FIG. 7 further comprises lenses 131C to 131F in addition to the configuration shown in FIG. 6. In the optical path changing part 131, light is condensed at the reflecting position in the first reflecting surface 131A, at the reflecting position in the second reflecting surface 131B, and at the midpoint between the respective reflecting positions in the first reflecting surface 131A and second reflecting surface 131B.

The lenses 131C and 131D act as a first condensing optical system disposed between the reflecting position in the first reflecting surface 131A and the midpoint, so that the light condensed on the first reflecting surface 131A is condensed again at the midpoint. The light becomes parallel light between the lenses 131C and 131D.

The lenses 131E and 131F act as a second condensing optical system disposed between the reflecting position in the second reflecting surface 131B and the midpoint, so that the light condensed on the second reflecting surface 131B is condensed again at the midpoint. The light becomes parallel light between the lenses 131E and 131F.

Changing the distance between the lenses 131C and 131D and the distance between the lenses 131E and 131F can adjust the light-condensing positions. Though the respective light-condensing positions of the wavelength components align along the y'-axis, the order of arrangement of wavelengths is reversed at the midpoint. Therefore, the wavelength components are collimated and condensed again at the midpoint, so as to resume the original wavelength arrangement direction.

In the configuration shown in FIG. 7, the luminous flux diameter is small at the respective reflecting positions in the first and second reflecting surfaces in each of the optical path changing parts 131 to 133, so that the loss in wavelength components in end parts becomes smaller, whereby characteristics of the optical multiplexer/demultiplexer 2 improve.

Third Embodiment

Figure 8:
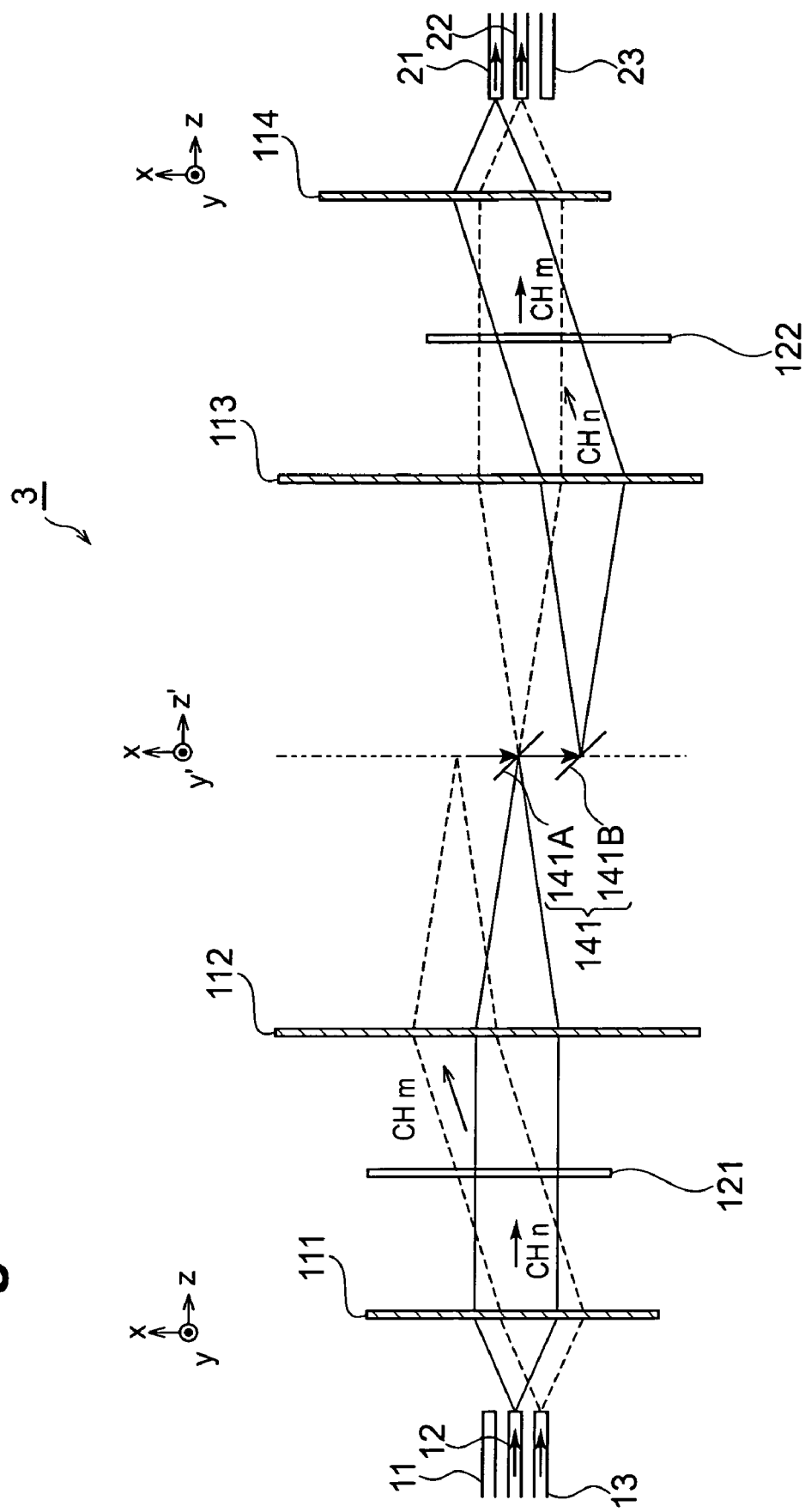
FIG. 8 is a schematic view of an optical multiplexer/demultiplexer of a third embodiment according to the present invention.

A third embodiment of the optical multiplexer/demultiplexer according to the present invention will now be explained. FIG. 8 is a schematic view of an optical multiplexer/demultiplexer of a third embodiment according to the present invention. The optical multiplexer/demultiplexer 3, shown in FIG. 8, comprises an optical system 111, a diffraction grating device 121, a plurality of optical path changing parts (only an optical path changing part 141 being depicted), an optical system 113, a diffraction grating device 122, and an optical system 114. The optical multiplexer/demultiplexer 3 has input/output ports at respective end face positions of the optical fibers 11 to 13, 21 to 23. When light is fed into any of the ports, individual wavelength components included in the light are outputted from any of the ports.

Between the optical fibers 11 to 13 and the diffraction grating device 121, and between the diffraction grating device 122 and the optical fibers 21 to 23, an xyz orthogonal coordinate system is set, whereas the z-axis is set parallel to the optical axes of the optical systems 111, 114. Between the diffraction grating devices 121 and 122, an xy'z' orthogonal coordinate system is set, whereas the z'-axis is set parallel to the optical axes of the optical systems 112, 113. The x-axis is set parallel to directions in which individual gratings extend in the diffraction grating devices 121 and 122.

FIG. 8 is a projected plan onto the xz-plane between the optical fibers 11 to 13 and the diffraction grating device 121 and between the diffraction grating device 122 and the optical fibers 21 to 23, and is a projected plan onto the xz'-plane between the diffraction grating devices 121 and 122. Projected plans onto the yz- (y'z'-) plane are similar to FIG. 3A and thus are not shown here.

The optical fibers 11 to 13 are arranged in parallel on a common plane parallel to the xz-plane. Similarly, the optical fibers 21 to 23 are arranged in parallel on a common plane parallel to the xz-plane. Light components incident on or emitted from the respective end faces of the optical fibers 11 to 13, 21 to 23 advance in parallel to the z-axis.

When light is emitted from any of the optical fibers 11 to 13, the optical system 111 inputs the light, collimates the inputted light, and outputs thus collimated light. The light outputted from the optical system 111 after being collimated advances parallel to the xz-plane.

The diffraction grating device 121 acts as a wavelength branching device, so as to input the light collimated by the optical system 111, spatially split wavelength components, and output thus split wavelength components to respective optical paths different from each other. The gratings of the diffraction grating device 121 extend along the x-axis.

Here, the individual wavelength components outputted from the diffraction grating device 121 advance in the same direction as that at the time of inputting to the diffraction grating device 121 when projected onto the xz- (xz'-) plane, and in respective directions different from each other depending on their wavelengths when projected onto the yz- (y'z'-) plane.

The optical system 112 condenses the wavelength components outputted from the diffraction grating device 121. Here, the wavelength components condensed by and outputted from the optical system 112 advance in directions parallel to the y'z'-plane. The respective light-condensing positions of the wavelength components align on a line which is located on the image-side focal plane P of the optical system and parallel to the y'-axis.

The optical path changing part 141 inputs the wavelength component λ1 condensed by the optical system 112, and outputs this wavelength component to an output optical path which is parallel to the input optical path of thus inputted wavelength component but is not on the same line. The same holds in the other optical path changing parts. The optical path changing parts can change their output optical paths. In particular, the optical path changing parts in this embodiment translate their input optical paths, so as to make output optical paths.

Figure 9:
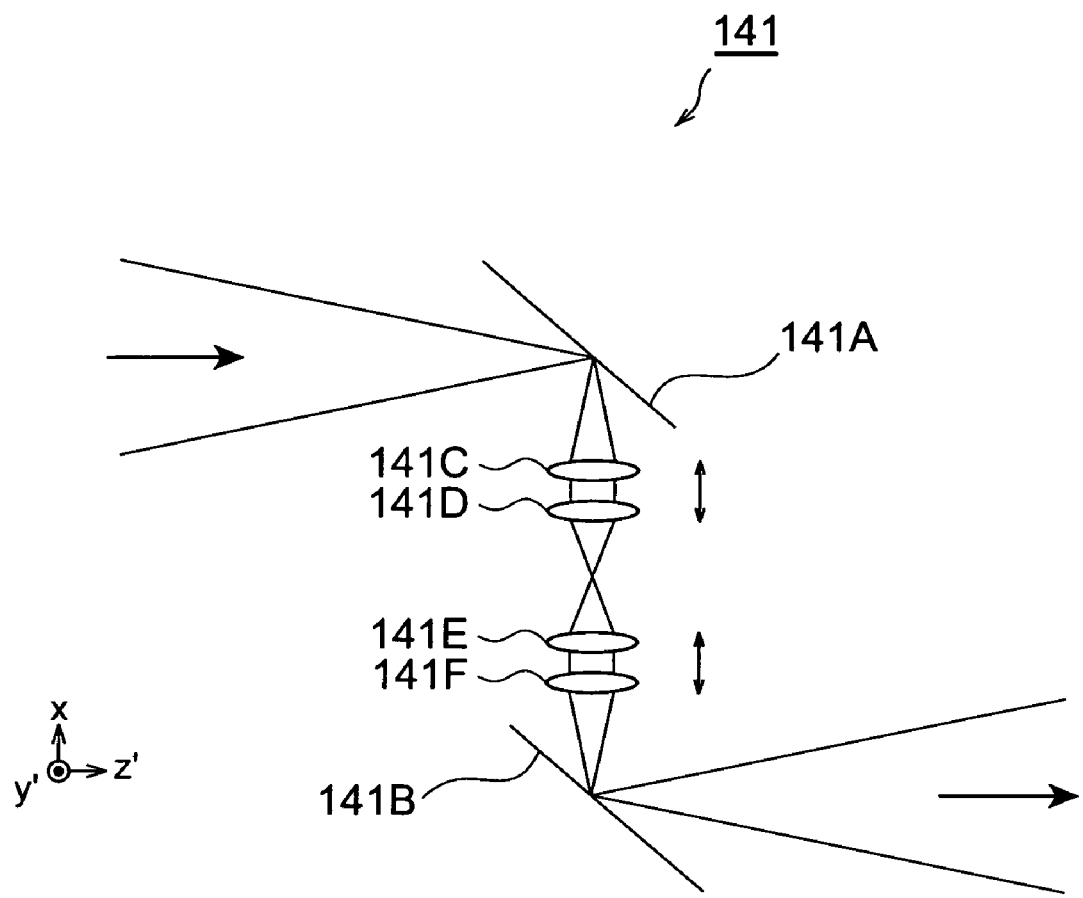
FIG. 9 is a view for explaining a configuration of the optical path changing part of the third embodiment.

FIG. 9 is a view for explaining the configuration of the optical path changing part 141. The optical path changing part 141 includes a first reflecting surface 141A and a second reflecting surface 141B, and lenses 141C to 141F. Each of the first reflecting surface 141A and second reflecting surface 141B is tilted by 45 degrees with respect to a plane (i.e., a plane parallel to the y'z'-plane) including principal rays of the individual wavelength components having traveled through the optical system 111, diffraction grating 121, and optical system 112 after being outputted from the sane port, and by 45 degrees with respect to the optical axis of the optical system 112 (i.e., a line parallel to the z'-axis). The optical path changing part 141 successively reflects light by the first reflecting surface 141A and the second reflecting surface 141B, so as to translate the optical path.

In the optical path changing part 141, light is condensed at the reflecting position in the first reflecting surface 141A, at the reflecting position in the second reflecting surface 141B, and at the midpoint between the respective reflecting positions in the first reflecting surface 141A and second reflecting surface 141B.

The lenses 141C and 141D act as a first condensing optical system disposed between the reflecting position in the first reflecting surface 141A and the midpoint, so that the light condensed on the first reflecting surface 141A is condensed again at the midpoint. The light becomes parallel light between the lenses 141C and 141D.

The lenses 141E and 141F act as a second condensing optical system disposed between the reflecting position in the second reflecting surface 141B and the midpoint, so that the light condensed at the midpoint is condensed again on the second reflecting surface 141B. The light becomes parallel light between the lenses 141E and 141F.

Changing the distance between the lenses 141C and 141D and the distance between the lenses 141E and 141F can adjust the light-condensing positions. Since the luminous flux diameter is small at the respective reflecting positions in the first and second reflecting surfaces, the loss in wavelength components in end parts becomes smaller, whereby the optical multiplexer/demultiplexer 3 improves its characteristics in the configuration shown in FIG. 9 as well.

In each optical path changing part, each of the first and second reflecting surfaces is movable in directions perpendicular to a plane (i.e., a plane parallel to the y'z'-plane) including principal rays of the individual wavelength components having traveled through the optical system 111, diffraction grating device 121, and optical system 112 after being outputted from the same port (i.e., directions parallel to the x-axis), whereas the output optical paths can be changed by this movement. Preferably, in each optical path changing part, the first and second reflecting surfaces have a fixed relative positional relationship therebetween, and are movable together in directions parallel to the x-axis. In each optical path changing part, the first and second reflecting surfaces have respective light-condensing positions thereon.

Referring to FIG. 8 again, the optical system 113 inputs light having translated its optical path by the optical path changing part, collimates the light, and then outputs thus collimated light. The diffraction grating device 122 inputs the collimated wavelength components, changes their advancing directions according to their wavelengths, and then outputs the wavelength components.

Here, the wavelength components outputted from the diffraction grating device 122 advance in the same direction as that at the time of inputting to the diffraction grating device 122 when projected onto the xz- (xz'-) plane, and in respective directions different from each other depending on their wavelengths when projected onto the yz- (y'z'-) plane.

In terms of comparison between before and after the optical path changing part, the optical paths of light before and after the diffraction grating device 121 and the optical paths of light before and after the diffraction grating device 122 are the same (though different in light advancing directions) when projected onto the yz- (y'z'-) plane, but differ from each other when projected onto the xz- (xz'-) plane.

The optical system 114 inputs and condenses the wavelength component outputted from the diffraction grating device 122, and makes them incident on any of the end faces of the optical fibers 21 to 23 by way of the respective optical paths parallel to the z-axis.

The optical multiplexer/demultiplexer 3 according to the third embodiment differs from the above-mentioned optical multiplexer/demultiplexers 1, 2 in that the optical path changing part translates the optical paths instead of tuning them, but operates in substantially the same manner and can yield similar effects.

MODIFIED EXAMPLE

Without being restricted to the above-mentioned embodiments, the present invention can be modified in various manners. For example, photonic crystals can be used as an optical path changing part. The diffraction grating device employed as a wavelength branching device may be of transmission type or reflection type. In the latter case, the optical systems 111 and 112 can be made as a common optical system. An optical waveguide formed in a planar substrate may be used in place of the optical fiber.

As described above, the present invention can provide a variable optical multiplexer/demultiplexer which can be made smaller and can restrain characteristics from deteriorating.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical multiplexer/demultiplexer which, when light is fed into any one of a plurality of ports, causes any one of said plurality of ports to output a wavelength component included in the light, said optical multiplexer/demultiplexer comprising:

a first optical system for outputting light fed into any one of said plurality of ports;

a first wavelength branching device for spatially splitting wavelength components included in the light and outputting the split wavelength components into respective optical paths different from each other;

a second optical system for condensing the wavelength components outputted from said first wavelength branching device;

a plurality of optical path changing parts for inputting the wavelength components condensed by said second optical system and outputting the wavelength components onto an output optical path not located on the same line as an input optical path of the inputted wavelength components, the output optical path being changeable;

a third optical system for inputting the light outputted from said optical path changing parts and outputting the light;

a second wavelength branching device for inputting the wavelength components outputted from said third optical system, changing a traveling direction of each inputted wavelength component according to the wavelength, and then outputting the wavelength components; and a fourth optical system for inputting the wavelength components outputted from said second wavelength branching device, condensing the wavelength components, and causing any one of said plurality of ports to output the wavelength components, wherein at least one of said first and third optical systems collimates the inputted light and outputs the collimated light, wherein said optical path changing parts include first and second reflecting surfaces substantially perpendicular to each other, wherein the optical axis of the first optical system is not parallel to the optical axis of the second optical system, wherein each of the first and second reflecting surfaces of said optical path changing part is movable in a direction substantially perpendicular to a plane including principal rays of the wavelength components having traveled through said first optical system, first wavelength branching device and second optical system after being outputted from the same port, and changes the output optical path by the movement, and wherein, when $f_1$ is the focal length of said first optical system, $f_2$ is the focal length of said second system and $\Delta x_f$ is the pitch of arrangement of said plurality of ports, $\Delta x_m$ is the pitch of arrangement of said optical path changing parts and the foregoing parameters satisfy the expression: $\Delta x_f f_1 = \Delta x_m / f_2$.

2. An optical multiplexer/demultiplexer according to claim 1, wherein at least one of said first and second wavelength branching devices includes a diffraction grating device.

3. An optical multiplexer/demultiplexer according to claim 1, wherein said first and fourth optical systems are common with each other, said second and third optical systems are common with each other, said first and second wavelength branching devices are common with each other, and said optical path changing part turns the input optical path so as to make the output optical path.

4. An optical multiplexer/demultiplexer according to claim 3, wherein each of the first and second reflecting surfaces is inclinable with respect to a plane including principal rays of the wavelength components having traveled through said first optical system, first wavelength branching device, and second optical system after being outputted from the same port and with respect to an optical axis of said second optical system, and wherein the first and second reflecting surfaces successively reflect the light, so as to turn the optical path.

5. An optical multiplexer/demultiplexer according to claim 3, wherein the first and second reflecting surfaces of said optical path changing part have a fixed relative positional relationship therebetween.

6. An optical multiplexer/demultiplexer according to claim 3, wherein a light-condensing position is located at a midpoint between the first and second reflecting surfaces of said optical path changing part.

7. An optical multiplexer/demultiplexer according to claim 3, wherein said plurality of ports are arranged in a direction perpendicular to a plane including principal rays of the wavelength components having traveled through said first optical system, first wavelength branching device, and second optical system after being outputted from the same port.

8. An optical multiplexer/demultiplexer according to claim 1, wherein said first and fourth optical systems are separate from each other, said second and third optical systems are separate from each other, said first and second wavelength branching devices are separate from each other, and said optical path changing part substantially translates the input optical path so as to make the output optical path.

9. An optical multiplexer/demultiplexer according to claim 8, wherein said optical path changing part includes first and second reflecting surfaces substantially parallel to each other, wherein each of the first and second reflecting surfaces is inclinable with respect to a plane including principal rays of the wavelength components having traveled through said first optical system, first wavelength branching device, and second optical system after being outputted from the same port and with respect to an optical axis of said second optical system, and wherein the first and second reflecting surfaces successively reflect the light, so as to translate the optical path.

10. An optical multiplexer/demultiplexer according to claim 8, wherein each of the first and second reflecting surfaces of said optical path changing part is movable in a direction substantially parallel to a plane including principal rays of the wavelength components having traveled through said first optical system, first wavelength branching device, and second optical system after being outputted from the same port, and changes the output optical path by the movement.

11. An optical multiplexer/demultiplexer according to claim 8, wherein the first and second reflecting surfaces of said optical path changing part have a fixed relative positional relationship therebetween.

12. An optical multiplexer/demultiplexer according to claim 8, wherein a light-condensing position is located at a midpoint between the first and second reflecting surfaces of said optical path changing part.

13. An optical multiplexer/demultiplexer according to claim 12, further comprising:
a first condensing optical system disposed between the first reflecting surface and the light-condensing position; and
a second condensing optical system disposed between the second reflecting surface and the light-condensing position,
wherein the first and second reflecting surfaces have respective light-condensing positions.

14. An optical multiplexer/demultiplexer according to claim 8, wherein said plurality of ports are arranged in a direction perpendicular to a plane including principal rays of the wavelength components having traveled through said first optical system, first wavelength branching device, and second optical system after being outputted from the same port.

15. An optical multiplexer/demultiplexer according to claim 1, wherein when the distance between adjacent ones of said plurality of ports is $\Delta x_{f,min}$ and the distance between the most apart ones among said plurality of ports is $\Delta x_{f,max}$, the first reflecting surface and the second reflecting surface are arranged in a manner that the minimum distance therebetween becomes smaller than the value defined by $\Delta x_{f,max} \cdot f_2/f_1$ and the maximum distance therebetween becomes greater than the value defined by $\Delta x_{f,max} \cdot f_2/f_1$.

16. An optical multiplexer/demultiplexer according to claim 1, wherein the first reflecting surface and the second reflecting surface are integrally fixed to each other.

17. An optical multiplexer/demultiplexer which, when light is fed into any one of a plurality of ports, causes any one of said plurality of ports to output a wavelength component included in the light, said optical multiplexer/demultiplexer comprising:
a first optical system for outputting light fed into any one of said plurality of ports;
a first wavelength branching device for spatially splitting wavelength components included in the light and outputting the split wavelength components into respective optical paths different from each other;
a second optical system for condensing the wavelength components outputted from said first wavelength branching device;
a plurality of optical path changing parts for inputting the wavelength components condensed by said second optical system and outputting the wavelength components onto an output optical path not located on the same line as an input optical path of the inputted wavelength components, the output optical path being changeable;
a third optical system for inputting the light outputted from said optical path changing parts and outputting the light;
a second wavelength branching device for inputting the wavelength components outputted from said third optical system, changing a traveling direction of each inputted wavelength component according to the wavelength, and then outputting the wavelength components; and
a fourth optical system for inputting the wavelength components outputted from said second wavelength branching device, condensing the wavelength components, and causing any one of said plurality of ports to output the wavelength components,
wherein a light-condensing position is located at a midpoint between the first and second reflecting surfaces of said optical path changing part,
wherein said optical path changing parts include first and second reflecting surfaces substantially perpendicular to each other,
wherein said optical multiplexer/demultiplexer further comprises:
a first condensing optical system disposed between the first reflecting surface and the light-condensing position; and
a second condensing optical system disposed between the second reflecting surface and the light-condensing position,
wherein the first and second reflecting surfaces have respective light-condensing positions.

* * * * *